United States Patent
Johnson et al.

(10) Patent No.: US 11,382,347 B2
(45) Date of Patent: Jul. 12, 2022

(54) NATURAL COOLING FORMULATIONS

(71) Applicant: WM. WRIGLEY JR. COMPANY, Chicago, IL (US)

(72) Inventors: Sonya Johnson, Chicago, IL (US); Minmin Tian, Chicago, IL (US); Eric Dowd, Chicago, IL (US); Gloria Sheldon, Chicago, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 3 days.

(21) Appl. No.: 15/773,839

(22) PCT Filed: Nov. 4, 2016

(86) PCT No.: PCT/US2016/060444
§ 371 (c)(1),
(2) Date: May 4, 2018

(87) PCT Pub. No.: WO2017/079506
PCT Pub. Date: May 11, 2017

(65) Prior Publication Data
US 2018/0310600 A1    Nov. 1, 2018

Related U.S. Application Data

(60) Provisional application No. 62/251,431, filed on Nov. 5, 2015.

(51) Int. Cl.
| | | |
|---|---|---|
| *A23L 27/10* | (2016.01) | |
| *A23G 3/34* | (2006.01) | |
| *A23G 4/06* | (2006.01) | |
| *A23L 27/00* | (2016.01) | |

(52) U.S. Cl.
CPC .............. *A23L 27/10* (2016.08); *A23G 3/34* (2013.01); *A23G 4/06* (2013.01); *A23L 27/86* (2016.08); *A23V 2002/00* (2013.01)

(58) Field of Classification Search
IPC ................ A23L 27/10,27/86; A23G 3/34, 4/06
See application file for complete search history.

(56) References Cited

U.S. PATENT DOCUMENTS

| | | | | |
|---|---|---|---|---|
| 4,011,270 A | * | 3/1977 | Carrington | C07C 35/12 131/275 |
| 5,663,460 A | * | 9/1997 | Yamamoto | A24B 15/301 568/828 |
| 6,627,233 B1 | * | 9/2003 | Wolf | A23G 4/06 426/3 |
| 2004/0141927 A1 | * | 7/2004 | Johnson | A23G 4/06 424/48 |
| 2006/0249167 A1 | | 11/2006 | Giersch | |
| 2007/0014888 A1 | | 1/2007 | Vanrietvelde | |
| 2007/0148283 A1 | * | 6/2007 | Harvey | A23L 27/2054 426/3 |
| 2007/0221236 A1 | * | 9/2007 | Kiefer | A61K 8/345 131/352 |
| 2010/0311833 A1 | | 12/2010 | Erman | |

FOREIGN PATENT DOCUMENTS

| | | |
|---|---|---|
| WO | 9913734 A1 | 3/1999 |
| WO | 2013043653 A1 | 3/2013 |

OTHER PUBLICATIONS

Zviely (Molecules of the Month: Menthyl Lactate, Feb. 16, 2010, https://www.perfumerflavorist.com/flavor/application/mint/84403907.html) (Year: 2010).*
Natural Advantage (Natural Advantage's Isopulegol, https://www.perfumerflavorist.com/flavor/rawmaterials/natural/Natural-Advantages-Isopulegol—483472641.html, Jun. 6, 2018) (Year: 2018).*
Hiserodt et al. (J. Agric. Food Chem., 2004, 52, 3536-3541) (Year: 2004).*

* cited by examiner

*Primary Examiner* — Jared Barsky

(57) ABSTRACT

Natural cooling formulations which include one or more natural cooling compounds and are suitable for use in consumer products are provided. Natural cooling compounds include natural isopulegol, natural menthyl lactate, natural menthyl succinate, natural menthol and combinations thereof. The disclosed formulations provide enhanced cooling attributes.

10 Claims, 6 Drawing Sheets

NATURAL COOLING FORMULATIONS

CROSS-REFERENCE TO RELATED APPLICATION

This application claims priority to U.S. Provisional Application No. 62/251,431, filed Nov. 5, 2015, which is incorporated by reference herein in its entirety.

FIELD

The presently disclosed subject matter relates to natural cooling formulations, particularly for use in oral products. Specifically, the present disclosure is directed to cooling compositions that include one or more natural cooling compounds.

BACKGROUND

Cooling is a desired consumer sensory attribute for numerous oral products, for example, confectionery products. A cooling perception is highly correlated with breath freshening effectiveness, flavor duration, and the increased overall liking of a product. Over the past few decades, various synthetic cooling compounds have been developed. They are widely used in chewing gum and mints as well as in dentifrice, mouthwash, and variety of oral care products.

Many cooling compounds used in commercial products are typically synthetically made. Therefore, there is a need in the art to develop natural cooling formulations comprising natural coolants with comparative and increased cooling perception, without increasing overall bitterness. The presently disclosed subject matter addresses this need as discussed in detail below.

SUMMARY OF THE INVENTION

The presently disclosed subject matter is directed to cooling compositions comprising one or more natural compounds selected from the group consisting of natural isopulegol, natural menthyl lactate, natural menthyl succinate, natural menthol, and combinations thereof.

In certain embodiments, the natural compounds are present in a range of from about 5% to about 75% w/w.

In certain embodiments, the cooling composition comprises from about 25% to about 75% w/w isopulegol. In certain embodiments, the cooling composition comprises from about 5% to about 50% w/w natural menthyl lactate. In certain embodiments, the cooling composition comprises from about 5% to about 50% w/w natural menthyl succinate. In certain embodiments, the cooling composition comprises from about 5% to about 50% w/w natural menthol.

In certain embodiments, the cooling composition comprises natural isopulegol, natural menthyl lactate, and natural menthyl succinate. In another embodiment, the cooling composition comprises natural isopulegol, natural menthyl lactate, natural menthyl succinate, and natural menthol.

In a specific embodiment, the cooling composition comprises about 50% natural isopulegol, about 30% natural menthyl lactate, and about 20% natural menthyl succinate. In another embodiment, the cooling composition comprises about 45% natural isopulegol, about 27% natural menthyl lactate, about 18% natural menthyl succinate, and about 10% natural menthol.

In a certain embodiment, a consumer product comprising the cooling composition disclosed herein is provided. In certain embodiments, the consumer product is selected from the group consisting of an oral product and a confectionary product. In certain embodiments, the confectionary product is selected from the group consisting of compressed mint, chewing gum, chewy candy, lozenge, and hard candy.

In certain embodiments, the cooling composition is present at a concentration of from about 0.0001 to about 3.0% weight/weight of the consumer product.

In certain embodiments, the cooling composition is present in an effective amount to provide enhanced cooling sensory attributes as compared to conventional cooling compositions without natural cooling compounds. In alternative embodiments, the cooling composition is present in an effective amount to provide reduced bitterness or off-taste as compared to conventional cooling compositions.

The foregoing has outlined broadly the features and technical advantages of the present disclosure in order that the detailed description that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

BRIEF DESCRIPTION OF THE DRAWINGS

FIG. 1A depicts the cooling intensity (y-axis) of each solution over time (x-axis). FIG. 1B depicts the bitterness intensity of each solution over time.

FIG. 2A depicts the cooling intensity (y-axis) of each solution over time (x-axis). FIG. 2B depicts the bitterness intensity of each solution over time.

FIG. 3A depicts the cooling intensity (y-axis) of each solution over time (x-axis). FIG. 3B depicts the bitterness intensity of each solution over time.

FIG. 4A depicts the cooling intensity (y-axis) over time (x-axis). FIG. 4B depicts bitterness intensity over time.

FIG. 5A depicts the oral cooling intensity (y-axis) versus time (x-axis). FIG. 5B depicts the nasal cooling intensity versus time. FIG. 5C depicts the overall burn intensity versus time. FIG. 5D depicts the bitterness intensity versus time.

DETAILED DESCRIPTION

Figure 1A:
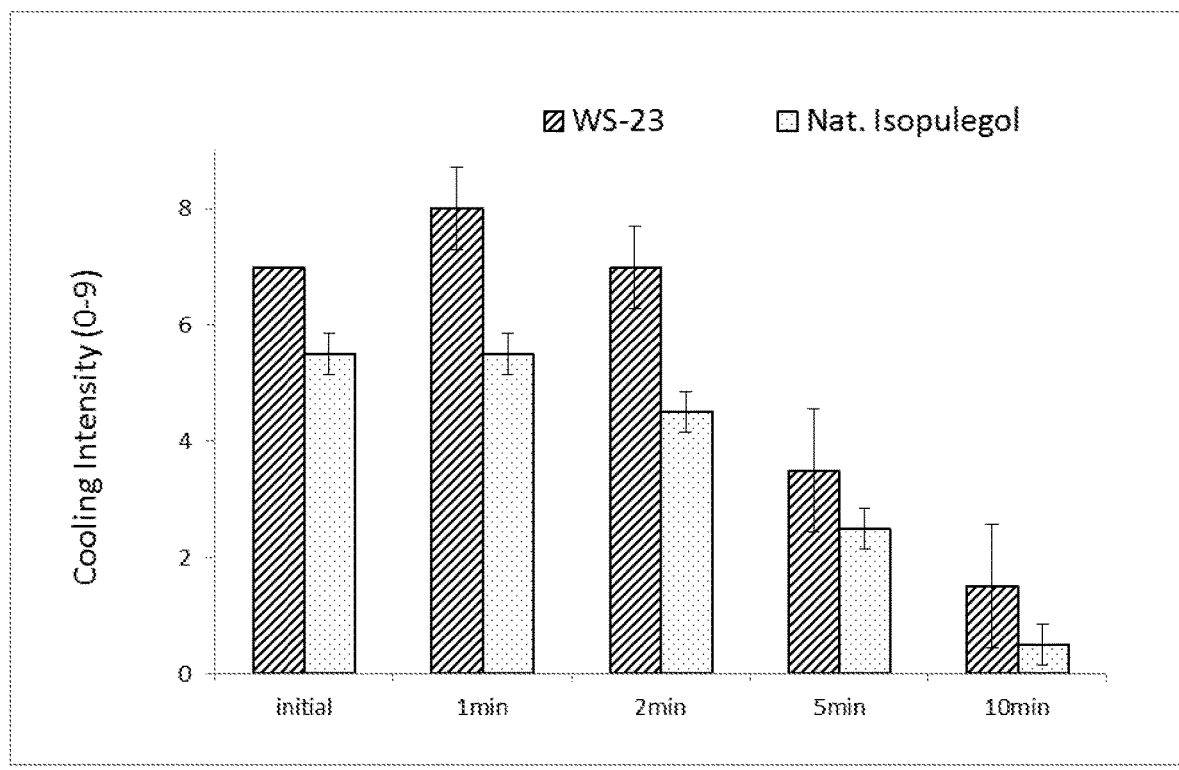
FIGS. 1A-1B provide a graphical representation of different attributes of natural isopulegol (500 ppm) versus N-2,3-trimethyl-2-isopropyl butanamide (WS-23) (500 ppm).
Figure 1B:
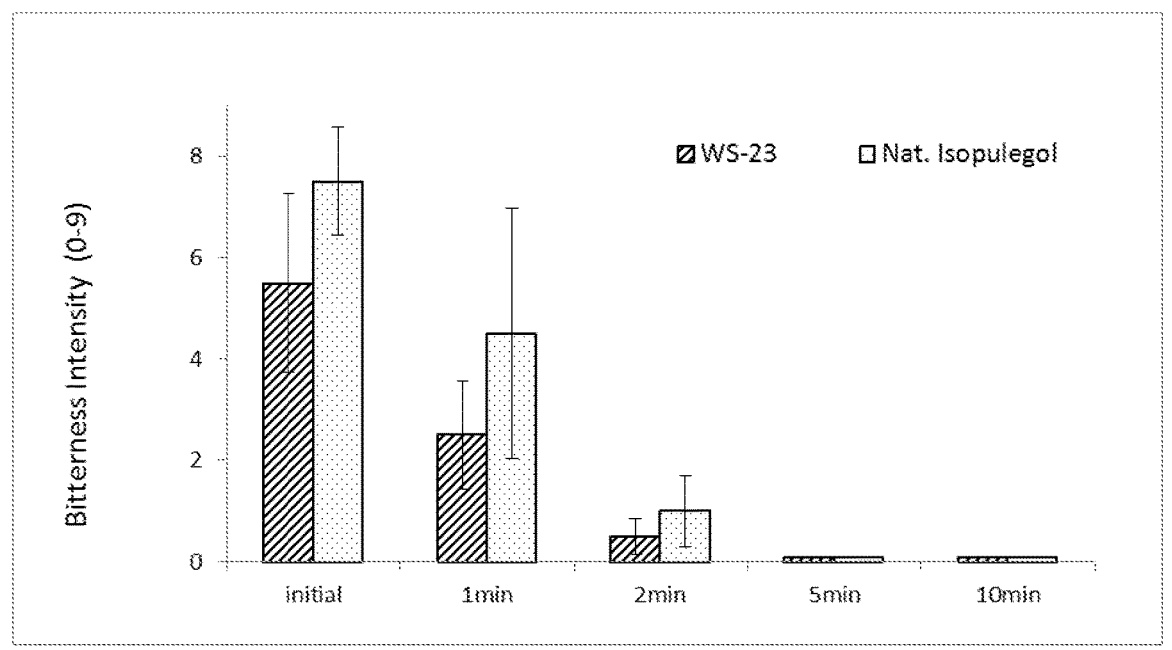
Figure 2A:
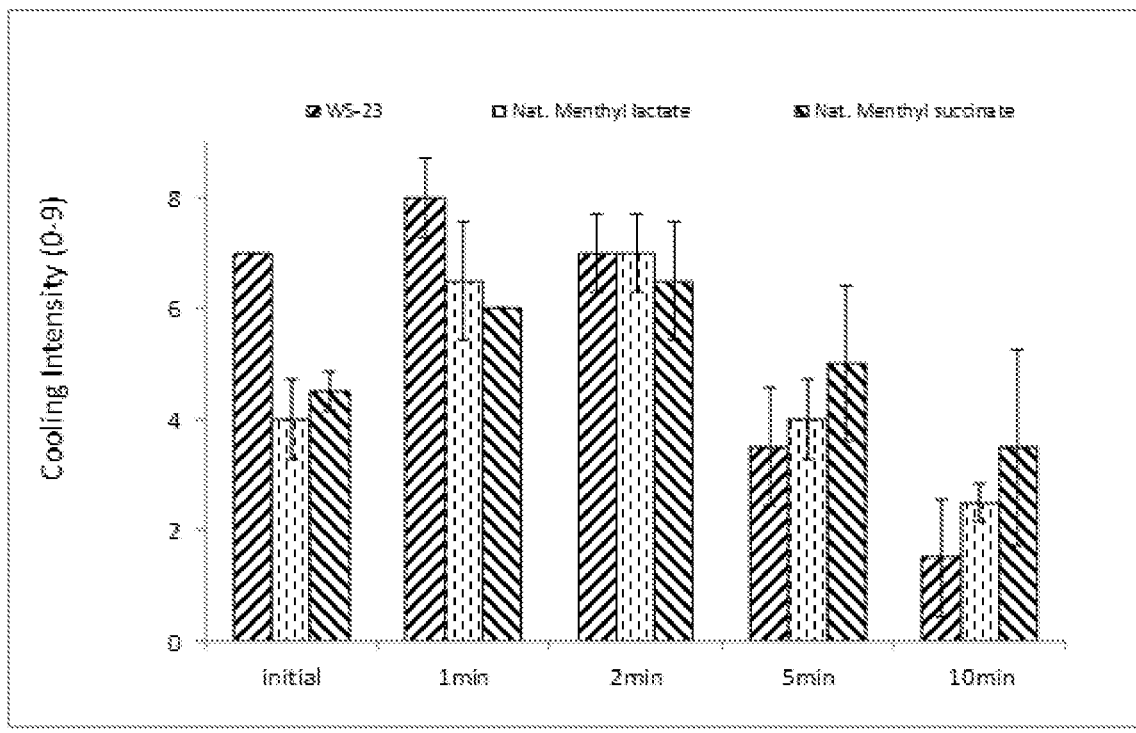
FIGS. 2A-2B provide a graphical representation of different attributes of natural menthyl lactate (500 ppm) and natural menthyl succinate (500 ppm) versus WS-23 (500 ppm).
Figure 2B:
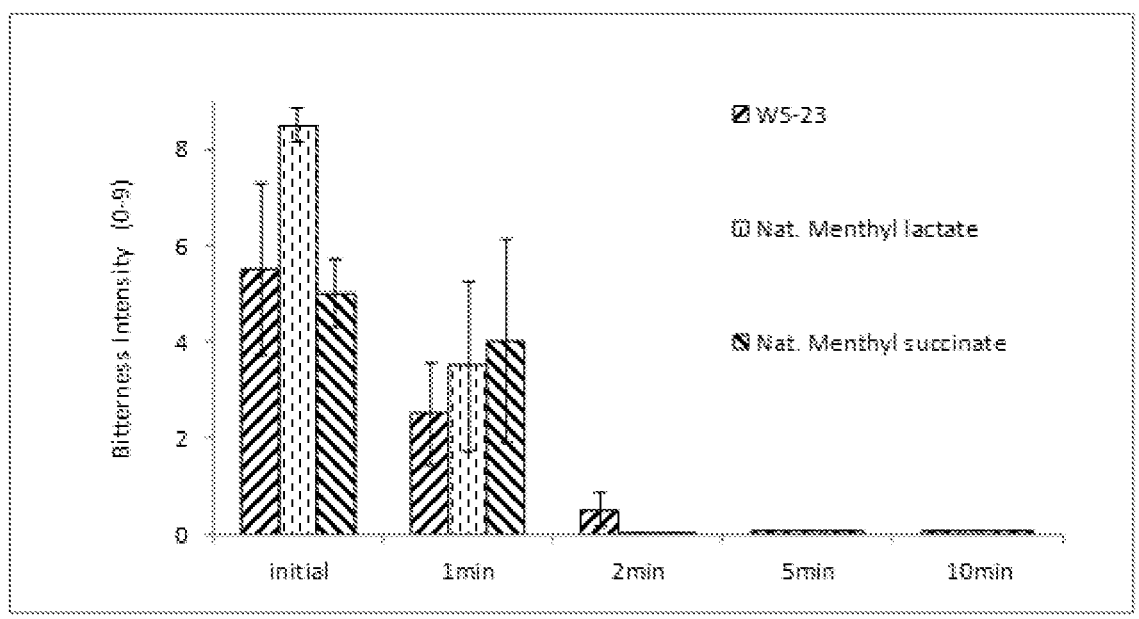

As noted above, there remains a need in the art for natural cooling compositions that provide cooling attributes to various oral products. The presently disclosed subject matter addresses this need through the use of one or more natural cooling compounds that provide cooling intensity without increasing bitterness of off-taste.

1. Definitions

The terms used in this specification generally have their ordinary meanings in the art, within the context of this disclosed subject matter and in the specific context where each term is used. Certain terms are discussed below, or elsewhere in the specification, to provide additional guidance to the practitioner in describing the compositions and methods of the disclosed subject matter and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value.

Unless otherwise specified, all percentages used herein are weight percents.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein "admixing," refers to the process where the cooling formulation is mixed with or added to the completed product or mixed with some or all of the components of the product during product formation or some combination of these steps. When used in the context of admixing, the term "product" refers to the product or any of its components. This admixing step can include a process selected from the step of adding the cooling formulation to the product, spraying the cooling formulation on the product, coating the cooling formulation on the product, suspending the cooling formulation in the product, painting the cooling formulation on the product, pasting the cooling formulation on the product, encapsulating the product with the cooling formulation, mixing the cooling formulation with the product and any combination thereof. The cooling formulation can be a liquid, dry powder, spray, paste, suspension, and any combination thereof.

As used herein, the term "chewing gum" or "chewy candy" refers to a flavored substance intended for chewing. The term "chewing gum" as used herein also includes bubble gum and confectionery products containing chewing gum. In certain embodiments, chewing gum forms include but are not limited to tablets, sticks, solid balls, hollow balls, cut and wrap, and pellets or pillows. As used herein, chewing gum contains a water insoluble base portion and a water-soluble bulk portion. The term "chewy candy" as used herein can have a chewy consistency approximating that of chewing gum, and can be swallowed after mastication.

As used herein, the terms "compressed mint" or "hard candy" refers to a hard confectionery product that requires sufficient strength to bite and/or shatter and primarily dissolves in the mouth by sucking.

As used herein, the term "lozenge" refers to a flavored tablet intended to be dissolved slowly in the mouth, and can soothe or provide temporary relief and lubrication to the throat.

As used herein, "physiological cooling agents" encompasses any number of physiological cooling agents, but does not include traditional flavor-derivatives such as menthol or menthone. Preferred physiological agents provide a cooling effect without imparting perceptible flavor of their own. Several known compounds have what can be characterized as a "cooling" activity, and are referred to in the art as "physiological cooling agents." Physiological cooling agents are perceived as cold or cool when contacted with the human body and, in particular, with the mucous membranes of the mouth, nose, and throat.

As used herein, the term "breath freshening agent" means compounds or compositions that counteract malodor. Breath freshening agents include, but are not limited to, salts of zinc, salts of copper, polyphenols, mushroom extracts, and mixtures thereof.

As used herein, the term "mouth odor masking flavor" means compounds or compositions that cover, mask, or overpower malodor. Mouth odor masking flavors include but are not limited to cinnamon, mint, wintergreen, fruit flavors, and mixtures thereof.

As used herein, the term "dental active agent" means compounds or compositions which promote oral health or deliver active ingredients to the teeth. Dental active agents include but are not limited to tooth whiteners, fluoride, stain removers, calcium salts, phosphate salts, and mixtures thereof.

As used herein, the term "WS-23" refers to N-2,3-trimethyl-2-isopropyl butanamide. WS-23 is disclosed in U.S. Pat. No. 6,627,233, which is incorporated by reference in its entirety herein.

2. Natural Cooling Formulations

The present disclosure relates to cooling formulations that include at least one, two, three, or more natural cooling compounds. In certain embodiments, the cooling formulations can be used to enhance or increase the longevity of a cooling sensory attribute of an oral product, including edible compositions. In further embodiments, the cooling formulations provide an enhanced cooling sensory attribute without increasing a bitter taste or off-taste in the oral product.

In certain non-limiting embodiments, the cooling formulation comprises a natural isopulegol compound having the following structure:

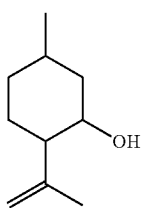

1-Isopulegol; MW = 154

In certain non-limiting embodiments, the cooling formulation comprises a natural menthyl lactate compound having the following structure:

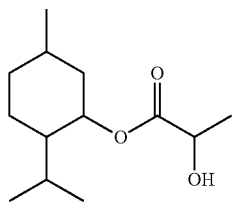

1-Menthyl lactate; MW = 228

In certain non-limiting embodiments, the cooling formulation comprises a natural menthyl succinate compound (also referred to as mono-menthyl succinate), having the following structure:

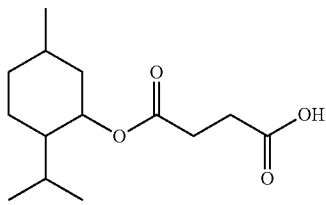

1-Menthyl succinate; MW = 256

In certain non-limiting embodiments, the cooling formulation comprises a natural menthol compound having the following structure:

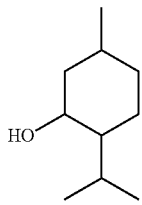

1-Menthol; MW = 156

In one non-limiting embodiment, the cooling formulation comprises one or more natural compounds selected from the group consisting of natural isopulegol, natural menthyl lactate, natural menthyl succinate, natural menthol, and combinations thereof.

In certain non-limiting embodiments, the one or more natural compounds are present in the cooling formulation in an amount of from about 5% to about 75% w/w of the total cooling formulation. In certain non-limiting embodiments, the one or more natural compounds are present in the cooling formulation in an amount of from about 25% to about 75%, of from about 35% to about 65%, of from about 45% to about 55%, or about 45% or about 55% w/w of the total cooling formulation. In other embodiments, the one or more natural compounds are present in the cooling formulation in an amount of from about 5% to about 50%, of from about 10% to about 40%, of from about 20% to about 35%, of from about 20% to about 35%, of from about 20% to about 30%, of from about 25% to about 35%, or about 10%, about 18%, about 20%, about 27%, or about 30% w/w.

In certain non-limiting embodiments, natural isopulegol is present in the cooling formulation in an amount of from about 25% to about 75% w/w, from about 35% to about 65% w/w, or about 45% to about 55% w/w.

In another non-limiting embodiment, natural menthyl lactate is present in the cooling formulation in an amount of from about 5% to about 50% w/w, from about 10% to about 40% w/w, from about 20% to about 35%, or about 20% to about 30% w/w.

In other non-limiting embodiments, natural menthyl succinate is present in the cooling formulation in an amount of from about 5% to about 50% w/w, from about 10% to about 40% w/w, from about 20% to about 35%, or about 25% to about 35% w/w.

In certain non-limiting embodiments, natural menthol is present in the cooling formulation in an amount of from about 5% to about 50% w/w, from about 10% to about 40% w/w, from about 20% to about 35%, or about 20% to about 30% w/w natural menthol.

In one non-limiting embodiment, the cooling formulation comprises about 50% natural isopulegol, about 30% natural menthyl lactate, and about 20% natural menthyl succinate. In another non-limiting embodiment, the cooling formulation comprises about 45% natural isopulegol, about 27% natural menthyl lactate, about 18% natural menthyl succinate, and about 10% natural menthol.

3. Sensory Attributes

In certain embodiments of the present disclosure, an oral composition can be produced that contains a sufficient amount of at least one, two, three, four, five or more natural cooling formulation(s), or its various subgenuses described herein, for example, a natural cooling compound, such as natural isopulegol, natural menthyl lactate, natural menthyl succinate, and/or natural menthol, to produce an oral composition having a desired cooling sensory attribute, such as enhanced cooling intensity and/or lowered bitterness intensity. In certain embodiments, the present disclosure relates to methods for enhancing or modulating a cooling sensory attribute of an edible product comprising: a) providing at least one comestible food product, or a precursor thereof, and b) combining the comestible food product or precursor thereof with at least a cooling sensory attribute modulating amount of at least one, two, three, four, five, or more natural cooling formulation(s), or any of its subgenuses, for example, one, two three, four, five or more natural cooling compounds, such as natural isopulegol, natural menthyl lactate, natural menthyl succinate, and/or natural menthol, so as to form a modified edible food product.

In certain embodiments, at least a cooling sensory attribute modulating amount of one, two, three, four, five or more of the natural cooling formulations of the present disclosure can be added to the edible food product, so that the cooling sensory attribute modified edible food product has an enhanced cooling sensory attribute, as compared to the edible food product prepared without the natural cooling formulation.

An enhanced cooling sensory attribute can be determined by human beings in general, or in the case of formulation testing, as determined by a taste panel of at least one, two, three, four, five or more human taste testers, via procedures known in the art and described in the examples herein. In certain embodiments, cooling sensory attributes can be evaluated by descriptive analysis or expert sensory analysis.

In certain embodiments of the present disclosure, the natural cooling formulation is added to an edible food product in an amount effective to enhance a cooling sensory attribute, without increasing bitter taste or off-taste. In one non-limiting example, admixing a natural cooling formulation comprising a combination of three or more natural cooling compounds with an edible food product provides the admixture with an enhanced cooling sensory attribute, and a reduced bitter taste or off-taste, compared to an admixture comprising an individual natural cooling compound of the cooling formulation.

The concentration of natural cooling formulation admixed with an oral product to modulate or enhance a cooling sensory attribute of the product or composition can vary dependent on variables, such as, the specific type of composition, what cooling compounds are already present in the product and the concentrations thereof, and the enhancer effect of the particular cooling formulation on such cooling compounds.

4. Consumer Products

The natural cooling formulations of the present disclosure can be used to enhance or modify a cooling sensory attribute of consumer products such as oral and edible food products.

The natural cooling formulations of the present disclosure can be used to enhance or modify a cooling sensory attribute of consumer products, such as edible food products, including but not limited to, chewing gum, mints, confections or candies, lozenges, edible film, pastilles, or beads.

A broad range of concentrations of the natural cooling formulations can be employed to enhance or modify a cooling sensory attribute of an edible food product. In certain embodiments of the present disclosure, the cooling formulation is admixed with a food product wherein the cooling formulation is present in an amount of from about 1 to about 30,000 ppm, or from about 5 to about 20,000 ppm, or from about 10 to about 10,000 ppm, or from about 50 to about 5,000 ppm, or from about 100 to about 1,000 ppm, or from about 150 to about 500 ppm, or from about 200 to about 250 ppm, and values in between. In another embodiment, the cooling formulation is present in an amount of from about 100 to about 3,000 ppm, or from about 500 to about 2,800 ppm, or from about 1,000 to about 2,500 ppm, and values in between.

In certain embodiments of the present disclosure, the cooling formulation is admixed with a food product wherein the cooling formulation is present in an amount of from about 0.0001 to about 3% weight/weight (w/w), or from about 0.0005 to about 2% w/w, or from about 0.001 to about 1% w/w, or from about 0.005 to about 0.5% w/w, or from about 0.01 to about 0.1% w/w, or from about 0.015 to about 0.05% w/w, or from about 0.02 to about 0.025% w/w, or from about 0.01 to about 0.3% w/w, or from about 0.05 to about 0.28% w/w, or from about 0.1 to about 0.25% w/w, and values in between. In alternative embodiments, the cooling formulation is present in amounts ranging from about 0.001 to about 2% w/w, or from about 0.025 to about 0.5% w/w, or from about 0.05 to about 0.1% w/w, or from about 0.075 to about 0.05% w/w, and values in between.

In one non-limiting embodiment, the cooling formulation is admixed with a food product wherein the cooling formulation is present in an amount of about 0.1% w/w. In certain embodiments, said cooling formulation comprises natural isopulegol, natural menthyl lactate, and natural menthyl succinate.

In one non-limiting embodiment, the cooling formulation is admixed with a food product wherein the cooling formulation is present in an amount of about 0.15% w/w. In certain embodiments, said cooling formulation comprises natural isopulegol, natural menthyl lactate, and natural menthyl succinate.

In one non-limiting embodiment, the cooling formulation is admixed with a food product wherein the cooling formulation is present in an amount of about 0.2% w/w. In certain embodiments, said cooling formulation comprises natural isopulegol, natural menthyl lactate, and natural menthyl succinate.

In certain embodiments, natural menthol is admixed with a food product wherein the natural menthol is present in an amount of about 0.1% w/w.

In certain embodiments of the present disclosure, the cooling formulation is encapsulated prior to use in an end product. In certain embodiments, the encapsulated formulation is admixed with a food product wherein the encapsulated cooling formulation is present in an amount of from about 1 to about 30,000 ppm, or from about 5 to about 20,000 ppm, or from about 10 to about 10,000 ppm, or from about 50 to about 5,000 ppm, or from about 100 to about 1,000 ppm, or from about 150 to about 500 ppm, or from about 200 to about 250 ppm, and values in between. In another embodiment, the cooling formulation is present in an amount of from about 100 to about 3,000 ppm, or from about 500 to about 2,800 ppm, or from about 1,000 to about 2,500 ppm, and values in between.

In certain embodiments, the cooling formulation is admixed with an oral product in an amount effective to enhance a cooling sensory attribute by from about 1 to about 10 fold, or from about 1.25 to about 8 fold, or from about 1.5 to about 6 fold, or from about 1.75 to about 4 fold, or from about 2 to about 2.5 fold, and values in between, compared to a cooling sensory attribute reference.

In certain embodiments, the cooling formulations of the present disclosure can be incorporated into a delivery system for use in oral compositions. For example, the cooling formulations can be delivered encapsulated or neat. Delivery systems can be liquid or solid, aqueous or non-aqueous. Delivery systems are generally adapted to suit the needs of the cooling formulation and/or the oral composition into which the cooling formulation will be incorporated.

In one embodiment, the cooling formulation can be encapsulated. Encapsulating materials and/or techniques can be selected to determine the type of modification of the cooling formulation. Encapsulating techniques include, for example, but are not limited to, spray drying, spray chilling, fluid-bed coating, and coacervation, wherein such techniques can provide partial encapsulation or full encapsulation In a specific non-limiting embodiment, the encapsulating materials and/or techniques are selected to modify the release profile of the cooling formulation from an edible food product, for example, to increase release of the cooling formation from an edible food product in the oral cavity or throat. Suitable encapsulating materials can include, but are not limited to, water-soluble sugar or sugar alcohol such as sorbitol, isomalt, dextrose, erythritol, lactitol, maltitol, mannitol, xylitol, hydrogenated corn syrup and mixtures thereof. Encapsulating materials can also include water soluble starch, modified starch, hydroxyl methyl cellulose, hydroxypropyl methylcellulose (HPMC), sodium alginate, alpha, beta and gamma cyclodextrin, polymers and combinations thereof.

4.1 Oral Products

The natural cooling formulations of the present disclosure can be used to enhance or modify a cooling sensory attribute of consumer products, such as oral products, including but not limited to, confectionery products, dentifrice, toothpaste, mouthwash, mouth spray, tobacco, and pharmaceuticals. The presently disclosed subject matter can be incorporated into oral products using conventional procedures and equipment and suitable additional components known in the art.

4.2 Confectionery Products

In certain embodiments, natural cooling formulations of the presently disclosed subject matter can be incorporated into a confectionery product.

In certain embodiments, natural cooling formulations of the present disclosure can be incorporated into the confectionery product by admixing the inventive formulation into conventional hard and soft confections. In certain embodiments, natural cooling formulations of the presently disclosed subject matter can be incorporated into confectionery products including, but not limited to, cakes, cookies, pies, candies (hard and soft), compressed mints, chewing gums, gelatins, ice creams, sorbets, jams, jellies, chocolates, fudge, fondant, liquorice, and taffy. Preferably, the natural cooling formulations of the presently disclosed subject matter are incorporated into compressed mints and chewing gum.

The presently disclosed subject matter can also be incorporated into chewing gum. In certain embodiments, the chewing gum can be in the form of tablets, sticks, solid balls, hollow balls, cut and wrap, and pellets or pillows. Suitable processes for making chewing gum and additional components that may be incorporated into chewing gum are described by way of example in U.S. Pat. No. 8,557,323; U.S. Publication Nos. 2013/0156885 and U.S. 2005/0202118, each of which is incorporated by reference in its entirety herein.

4.2.1 Mints

The presently disclosed subject matter can be incorporated into mint confectionaries, and more particularly into compressed mint products using conventional tablet pressing procedures and equipment and suitable additional components known in the art, for example, as described by U.S. Pat. Nos. 8,557,323 and 8,431,150, each of which is incorporated by reference in its entirety herein.

Compressed mints of the presently disclosed subject matter can contain sugar or can be sugarfree. In addition to the disclosed cooling compositions, other suitable flavoring agents can be included as well as ingredients that give a tingling sensation. In the case of products with multiple layers, each layer may have different flavoring agents or levels. In one embodiment, the compressed mint can comprise a coating layer covering at least a portion of the product. In that case, the coating layer can contain flavoring agents at a level higher than any flavoring agents in the remainder of the product.

The compressed mints can include one or more of the following: anti-microbial agents; physiological cooling agents; breath freshening agents; breath freshening and mouth odor masking flavors; dental active agents; and combinations thereof.

In certain embodiments, the compressed tablet further contains one or more additional compounds including but not limited to sorbitol (e.g., 90-99% w/w), acesulfame K (e.g., 0.05-0.5% w/w), sucralose (e.g., 0.05-0.5% w/w), magnesium stearate (e.g., 0.5-2% w/w), Neobee oil (e.g., 1-2% w/w), peppermint oil (e.g., 0.5-2% w/w), and combinations thereof.

4.2.2 Chewing Gum

The presently disclosed subject matter can be incorporated into chewing gum using conventional procedures and equipment and suitable additional components known in the art, for example, as described by U.S. Publication Nos. 2013/0156885 and U.S. 2005/0202118, each of which is incorporated by reference in its entirety herein.

In certain embodiments, natural coolants can be mixed and added to flavor, and then added to the gum mixture. In certain embodiments, a natural coolant blend can be added directly to the gum mixture. In other embodiments, natural cooling agents can be encapsulated, or formulated in a coating layer to enhance release from the chewing gum.

A chewing gum center composition or other chewing gum compositions can contain a chewable gum base portion, which is essentially free of water and is water-insoluble, a water-soluble bulk portion and flavors which can be water insoluble. The water-soluble portion can dissipate with a portion of the flavor over a period of time during chewing. The gum base portion is retained in the mouth throughout the chew.

In certain embodiments, the insoluble gum base comprises elastomers, elastomer solvents, plasticizers, waxes, emulsifiers and/or inorganic fillers. In certain embodiments, the insoluble gum base can comprise elastomers, elastomer solvents, plasticizers, waxes, emulsifiers and/or inorganic fillers. Plastic polymers, such as polyvinyl acetate, which can behave as plasticizers, can also be included. In certain embodiments, plastic polymers can include but are not limited to, polyvinyl laureate, polyvinyl alcohol and polyvinyl pyrrolidone. Non-limiting examples of elastomers can include polyisobutylene, butyl rubber, (isobutylene-isoprene copolymer) and styrene butadiene rubber, as well as natural latexes such as chicle. In certain embodiments, elastomer solvents can include resins such as terpene resins. In certain embodiments, the plasticizers are fats and oils, including but not limited to, tallow, hydrogenated and partially hydrogenated vegetable oils, and cocoa butter. In certain embodiments, the waxes include, but are not limited to, paraffin, microcrystalline and natural waxes such as beeswax and carnauba.

In certain embodiments, the chewing gum further contains one or more flavor components that are derived from artificial or natural sources or combinations thereof. In certain embodiments, the chewing gum can contain sugar, or may be sugar-free. In certain embodiments, the chewing gum can comprise high potency sweeteners including, but not limited to, synthetic substances, saccharin, thaumatin, alitame, saccharin salts, aspartame, sucralose, stevia, and acesulfame.

In certain embodiments, the chewing gum further contains one more coloring agents. In certain embodiments, the coloring agents can be food quality dyes.

In certain embodiments, the insoluble gum base constitutes from about 5% to about 95% by weight of the gum. In certain embodiments, the insoluble gum base comprises from about 10% and about 50% by weight of the gum or from about 20% to about 35% by weight of the gum.

In certain embodiments, the high potency sweetener can comprise from about 0.02% to about 1.0%, or from about 0.05% to about 0.5% by weight of the chewing gum formulation.

In certain embodiments, the natural cooling formulation can be added to the chewing gum formula in an amount such that it will contain from about 0.1% to about 3% natural cooling formulation, from about 0.2% to about 2% natural cooling formulation, from about 0.25% to about 1.0% natural cooling formulation, about 0.1% natural cooling formulation, about 0.15% natural cooling formulation or about 0.2% natural cooling formulation.

Natural cooling agents generally release slowly from chewing gum during mastication because of their low solubility in water. In certain embodiments, the chewing gum formation process can include modification of one or more natural cooling agents by encapsulation. In certain embodiments, encapsulation modifies the release of natural cooling compounds from the chewing gum by modifying the solubility or dissolution rate. Any standard technique which gives partial or full encapsulation of the combination of natural cooling agents can be used. In certain embodiments of the presently disclosed subject matter, encapsulation techniques include, but are not limited to, spray drying, spray chilling, fluid-bed coating, and coacervation. In certain embodiments, encapsulation techniques that give partial encapsulation or full encapsulation can be used.

In certain embodiments, suitable encapsulating materials can include, but are not limited to, water-soluble sugar or sugar alcohol such as sorbitol, isomalt, dextrose, erythritol, lactitol, maltitol, mannitol, xylitol, hydrogenated corn syrup and mixtures thereof. In certain embodiments, encapsulating materials can also include water soluble starch, modified starch, hydroxyl methyl cellulose, hydroxypropyl methylcellulose (HPMC), sodium alginate, alpha, beta and gamma cyclodextrin, polymers and combinations thereof. In certain embodiments, the coating compositions can be susceptible to water permeation to various degrees. In certain embodiments, the coating composition is a food grade material.

EXAMPLES

The presently disclosed subject matter will be better understood by reference to the following Examples, which are provided as exemplary of the disclosed subject matter, and not by way of limitation.

Example 1: Natural Coolants Versus Menthol

In this Example, natural compounds were compared to natural menthol for cooling and bitterness properties.

A. Preparation 100 ppm of naturally sourced menthyl lactate, menthyl succinate, and isopulegol were screened in 5% sugar solution for cooling and bitterness properties relative to 100 ppm menthol in 5% sucrose solution.

B. Evaluation 10 mL of each sample was orally evaluated by a panel (N=6) for 10 seconds, then expectorated. Cooling strength, flavor strength, and bitterness or off-taste was evaluated on a 9-point scale in comparison to 100 ppm menthol evaluated as a control, with 0 being the lowest and 9 being the highest measure on the scale. Subjects evaluated the coolant attributes at T0 (immediately after expectorating), 1, 2, 5 and 10 minute time points post expectoration.

Prior to the test, each subject calibrated their cooling and bitterness scale by performing the same evaluation on 10 mL of 100 ppm of L-menthol (prepared the same way as the natural coolants). The menthol solution was held in the mouth for 10 seconds as a calibration sample and the cooling strength and bitterness were fixed as 5.0 at the initial T0 time point.

Panelists were asked to rate the cooling and bitterness intensity of the compounds in solution, relative to the solution of 100 ppm of menthol, when tested in comparative screenings. The ratings are summarized in Table 1, showing the cooling and bitterness of the coolants compared to menthol.

TABLE 1

Summary of Cooling and Bitterness Properties

| Coolant | Cooling Relative to 100 ppm Menthol | Bitterness Relative to 100 ppm Menthol |
|---|---|---|
| Menthol (Control) | 1.0 | 1.0 |
| Natural Isopulegol | 0.7 | 0.8 |
| Natural Menthyl Lactate | 1.1 | 1.7 |
| Natural Menthyl Succinate | 0.6 | 0.8 |

Example 2: Sensory Analysis Panel of Natural Coolant Solutions Versus Synthetic WS-23

In this Example, natural coolants were evaluated by a sensory analysis panel.

A. Preparation

Natural coolants, including menthyl lactate, menthyl succinate, and isopulegol were dissolved in ethanol (100% USP grade) to produce 1% solution. The solution was subsequently diluted in 5% sucrose-water solution to produce 500 ppm of coolant solution.

B. Evaluation 10 mL of each sample was orally evaluated by a panel (N=6) for 10 seconds, then expectorated. Cooling strength, flavor strength, and bitterness or off-taste was evaluated on a 9-point scale in comparison to 100 ppm menthol evaluated as a control, with 0 being the lowest and 9 being the highest measure on the scale. Subjects evaluated the coolant attributes at T0 (immediately after expectorating), 1, 2, 5 and 10 minute time points post expectoration.

Prior to the test, each subject calibrated their cooling and bitterness scale by performing the same evaluation on 10 mL of 100 ppm of L-menthol (prepared the same way as the natural coolants). The menthol solution was held in the mouth for 10 seconds as a calibration sample and the cooling strength and bitterness were fixed as 5.0 at the initial T0 time point. As a comparative sample, the natural coolants were rated against the 10 ml of 500 ppm synthetic cooling compound WS-23, prepared in the same way as the natural coolants. Solution test results are summarized in FIGS. 1A-1B and FIGS. 2A-2B.

The cooling characteristics of the individual natural coolants as compared to WS-23 showed it was possible to achieve a similar a cooling profile as WS-23 by combining the three natural coolants into a blend.

Example 3: Coolant Blends

In this Example, two solutions comprising blends of natural coolant compounds were prepared and tested by the same sensory panel using the same as Example 2.

A. Coolant Blend Solutions

I. Preparation and Analysis

The compositions of Blend A and Blend B are summarized in Table 2.

TABLE 2

Blend A and Blend B Compositions.

| Compound | Blend A Concentration (wt %) | Blend B Concentration (wt %) |
| --- | --- | --- |
| Natural Isopulegol | 50% | 45% |
| Natural Menthyl Lactate | 30% | 27% |
| Natural Menthyl Succinate | 20% | 18% |
| Natural Menthol | — | 10% |

Blend A was a combination of the three noted natural cooling compounds. Blend B was a combination of the four noted natural cooling compounds (A+Natural Menthol). To prepare Blends A and B, the appropriate amounts of natural menthyl succinate, natural menthyl lactate and natural menthol were added to natural isopulegol, and warmed until completely dissolved. The blends were cooled and stored at room temperature prior to use.

The natural coolant blends (tested at 500 or 1000 ppm in 5% sucrose solution prepared the same way as described in Example 2) were evaluated and rated against 10 ml of 500 ppm synthetic cooling compound WS-23 in 5% sucrose solution (prepared in the same way as described in Example 2). Solution test results are summarized in FIGS. 3A and 3B.

II. Results

Figure 3A:
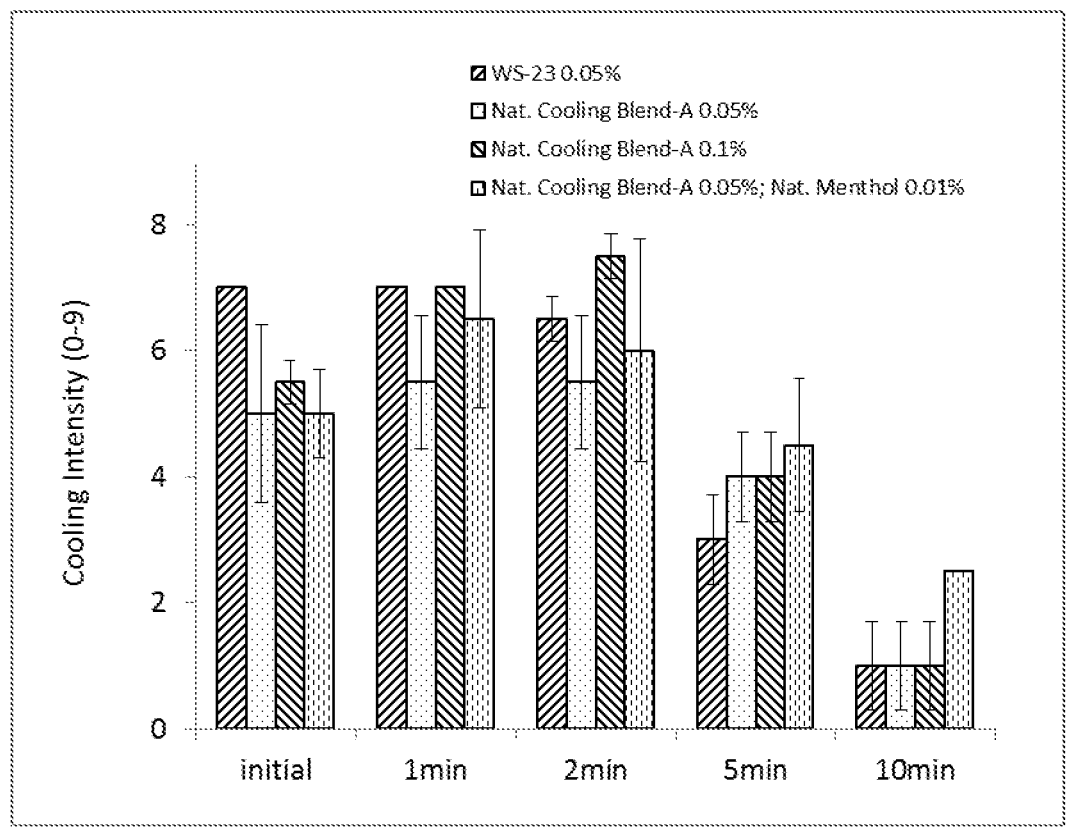
FIGS. 3A-3B provide a graphical representation of different attributes of solutions of a natural cooling blend versus WS-23 as described in Example 3.
Figure 3B:
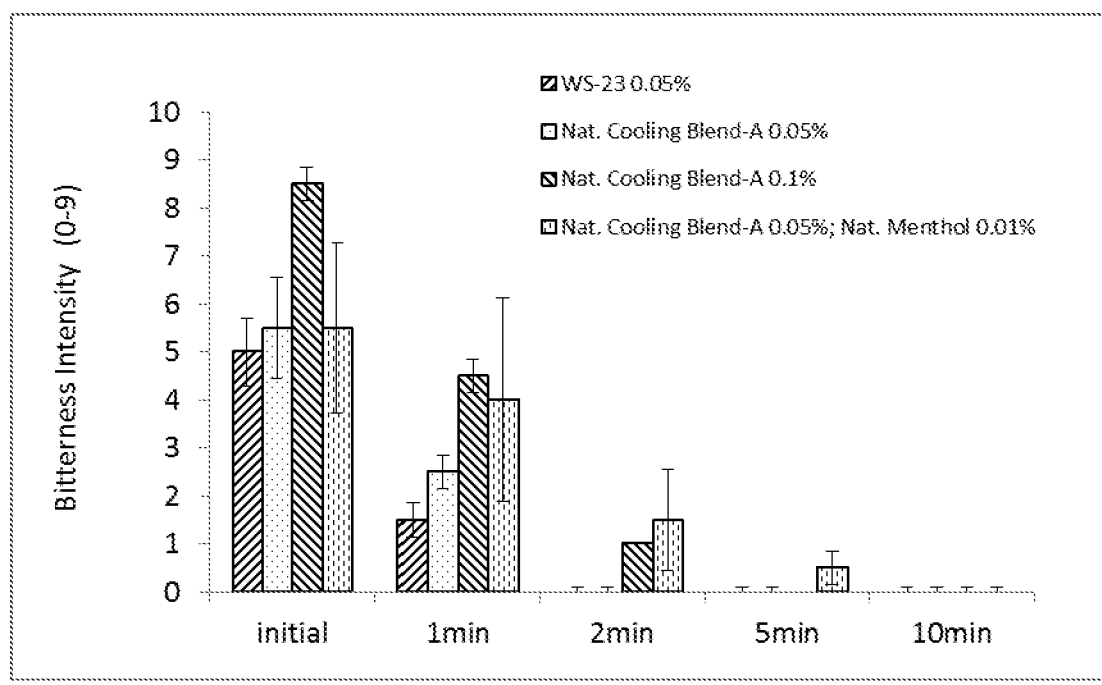

FIGS. 3A and 3B show the dose-response of Blend A and Blend B versus WS-23. 500 ppm of Blend A showed a very similar cooling profile to WS-23, except for initial cooling intensity. Doubling the natural coolant concentration of Blend A to 1000 ppm did not show appreciable increase of the cooling intensity, but imposed a significant amount of bitterness. The optimal concentration of Blend A was about 500 ppm in solution.

B. Coolant Blends in Gum

I. Preparation and Analysis

Peppermint gum (piece weight of 2.7 g), was prepared with Blend A at 0.1, 0.15, or 0.2% and compared to 0.1% WS-23 (control). The gum was chewed by N=6 panelists for 20 min. The results are summarized in FIGS. 4A and 4B.

II. Results

Figure 4A:
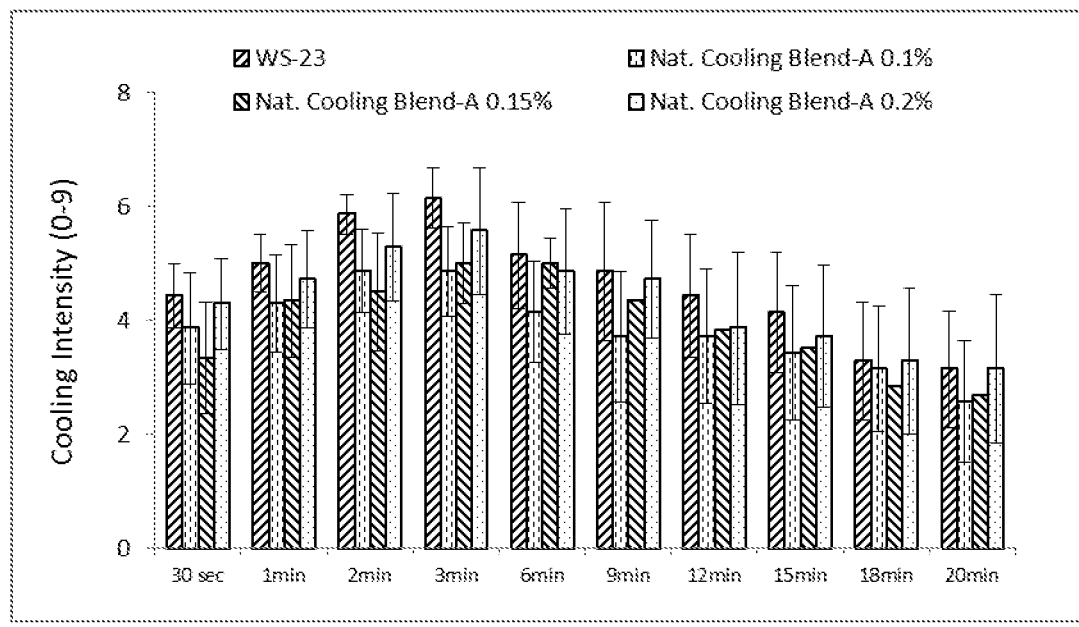
FIGS. 4A-4B provide a graphical representation of the panel taste evaluation of different forms of Cooling Blend (A) in peppermint gum. Specifically.
Figure 4B:
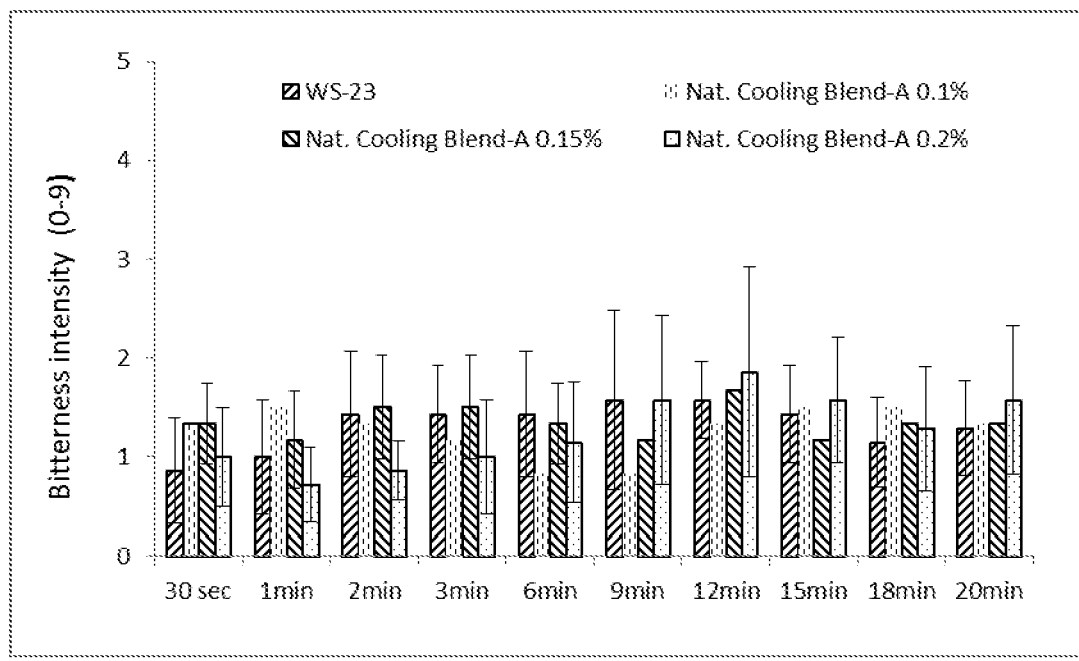
Figure 5A:
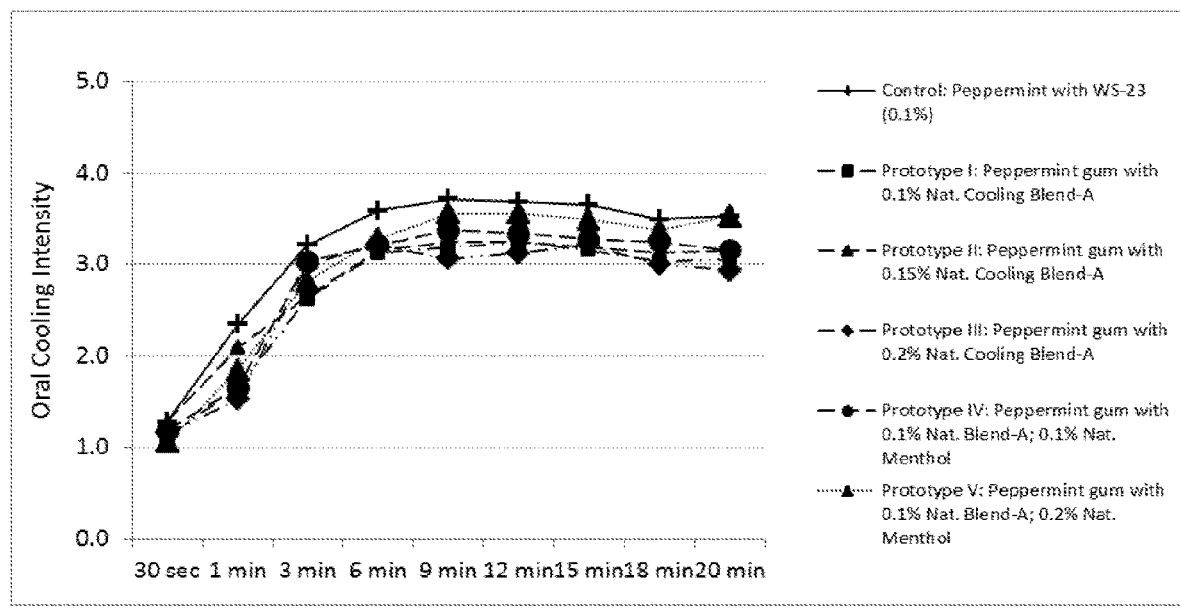
FIGS. 5A-5D provide a graphical representation of the descriptive analysis of peppermint gum comprising different levels of natural cooling blends versus WS-23. The natural cooling blend contained 50% of natural isopulegol, 30% of natural menthyl lactate and 20% of natural menthyl succinate.
Figure 5B:
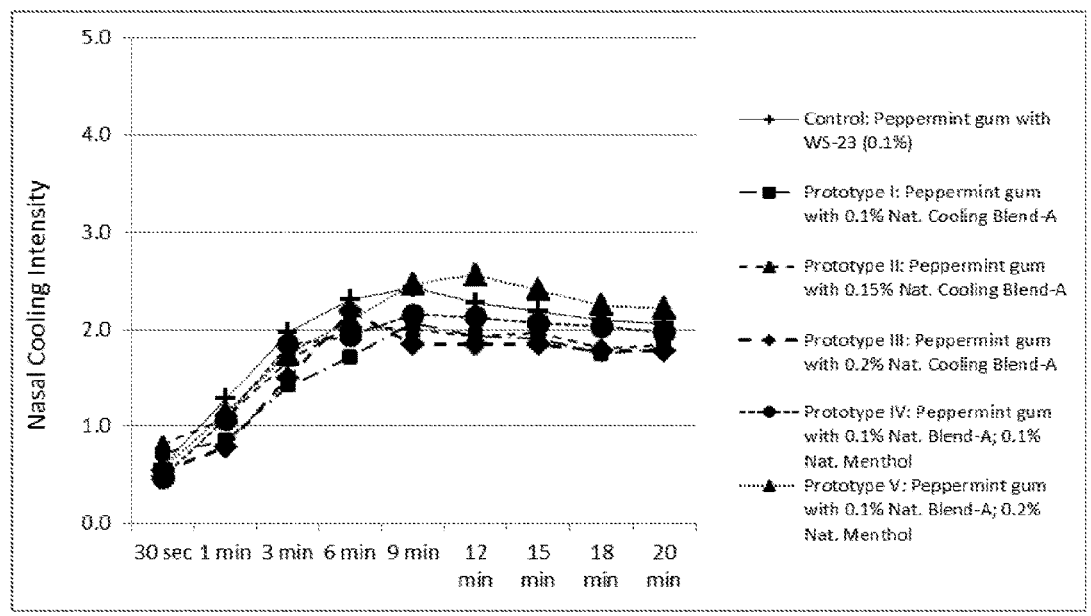
Figure 5C:
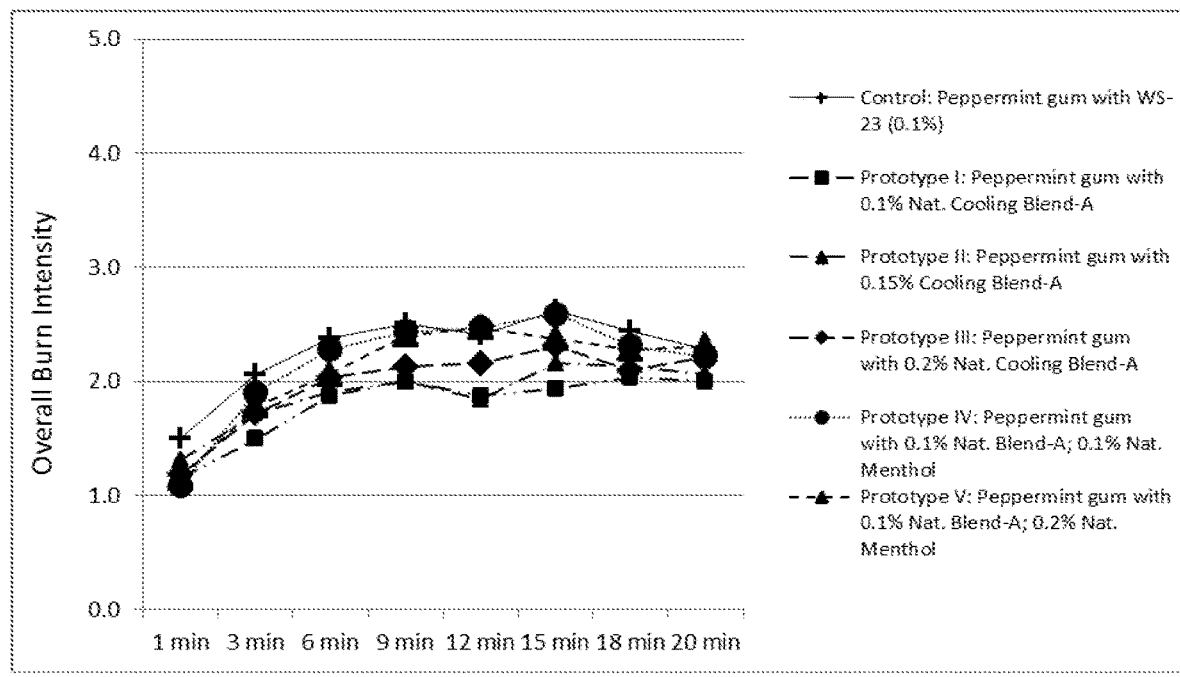
Figure 5D:
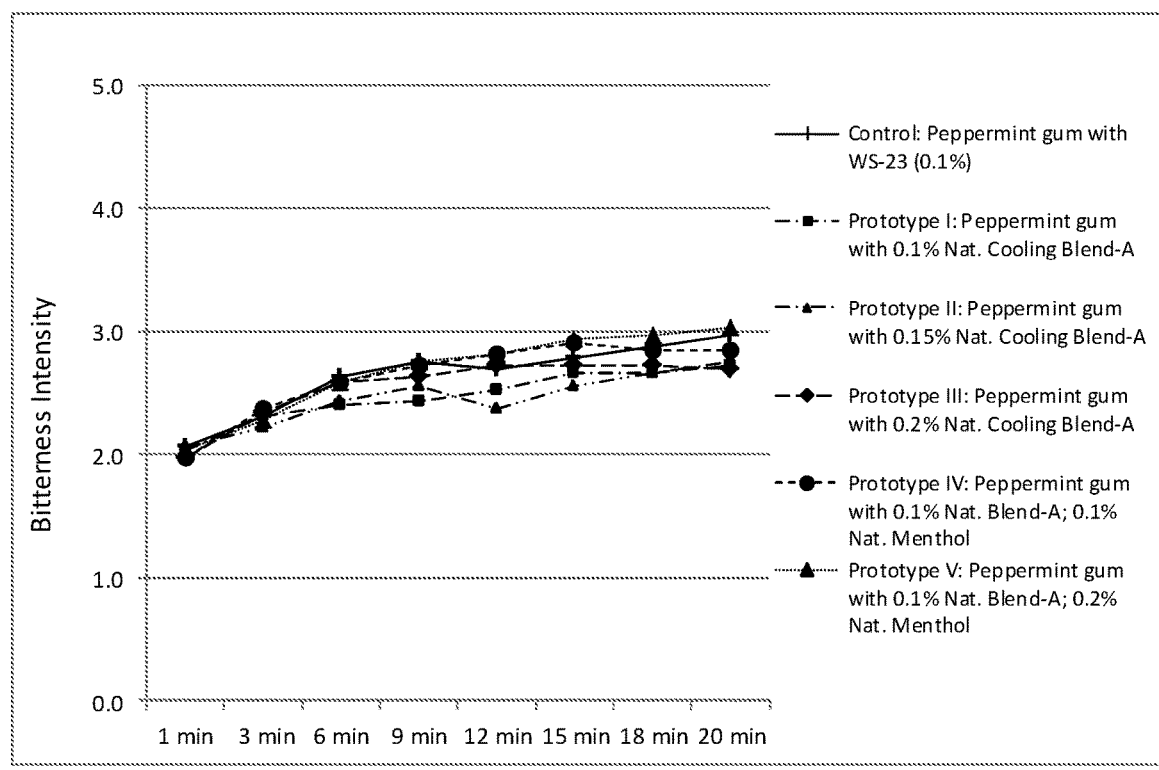

FIGS. 4A and 4B show the dose-response of Blend A in peppermint gum. The Blend had a similar cooling profile to the control gum, except demonstrated a slightly weaker initial cooling intensity.

Example 4: Descriptive Analysis Test

This Example provides an Expert Panel (N=12) descriptive analysis (DA) test of natural cooling blends in a peppermint gum product.

A. Preparation and Analysis

Five peppermint gums (Prototypes I-V) containing various level of Blend A, and one WS-23 control peppermint gum, were formulated. The piece weight of stick gum was 2.7 grams. The gum compositions are summarized in Table 3.

TABLE 3

Gum Compositions.

| Ingredient | Control: Peppermint Gum | Prototype I: Peppermint with 0.1% Blend-A | Prototype II: Peppermint with 0.15% Blend-A | Prototype III: Peppermint with 0.2% Blend-A | Prototype IV: Peppermint with 0.1% Blend-A; 0.1% Nat. Menthol | Prototype V: Peppermint with 0.1% Blend-A; 0.2% Nat. Menthol |
| --- | --- | --- | --- | --- | --- | --- |
| Bulk Sweetener | 60-80% | 60-80% | 60-80% | 60-80% | 60-80% | 60-80% |
| Gum base | 20-30% | 20-30% | 20-30% | 20-30% | 20-30% | 20-30% |
| Peppermint Flavor | 1.5-2.5% | 1.5-2.5% | 1.5-2.5% | 1.5-2.5% | 1.5-2.5% | 1.5-2.5% |
| WS-23 | 0.10% | | | | | |
| Natural Cooling Blend-A | | 0.10% | 0.15% | 0.20% | 0.10% | 0.10% |
| Natural Menthol | | | | | 0.10% | 0.20% |
| High Potency Sweeteners | 0.5-1.5% | 0.5-1.5% | 0.5-1.5% | 0.5-1.5% | 0.5-1.5% | 0.5-1.5% |
| Color | 0-0.5% | 0-0.5% | 0-0.5% | 0-0.5% | 0-0.5% | 0-0.5% |
| TOTAL | 100.00% | 100.00% | 100.00% | 100.00% | 100.00% | 100.00% |

Prototypes I-V were evaluated for sensory parity versus the control peppermint gum containing WS-23. During the test, the descriptive panel (N=12) chewed each gum for 20 minutes and evaluated for various attributes, including oral cool, nasal cool, and flavor and sweetener intensity, bitterness, and off-taste.

B. Results

The results of the descriptive analysis test of different prototype gums in combination with different levels of coolant blends as compared to WS-23 control are summarized in Table 4 and FIGS. 5A-5D.

TABLE 4

Summary of DA test

| DA Property | Prototype I:<br>Peppermint<br>w/0.1% Nat.<br>Cooling<br>Blend-A | Prototype II:<br>Peppermint<br>w/0.15% Nat.<br>Cooling<br>Blend-A | Prototype III:<br>Peppermint<br>w/0.2% Nat.<br>Cooling<br>Blend-A | Prototype IV:<br>Peppermint<br>w/0.1% Nat.<br>Blend-A and 0.1%<br>Nat. Menthol | Prototype V:<br>Peppermint<br>w/0.1% Nat.<br>Blend-A and 0.2%<br>Nat. Menthol |
|---|---|---|---|---|---|
| Oral Cooling | lower from 1-9 min | lower beyond 9 min | maybe low upfront (at ~1 min), lower beyond 9 min | maybe low upfront (at ~1 min) | maybe low upfront (at ~1 min) |
| Nasal Cooling | maybe low upfront (at ~3 min) | parity to WS-23 | lower from 1-9 min | parity to WS-23 | parity to WS-23 |
| Overall Burn | lower from 3-18 min | lower from 6-15 min | parity to WS-23 | parity to WS-23 | parity to WS-23 |
| Overall Numbing | parity to WS-23 | maybe low upfront (at ~9 min) | parity to WS-23 | parity to WS-23 | parity to WS-23 |
| Overall Flavor | lower from 1-3 min | lower (at ~1 min) | lower (at ~1 min), but higher from 9-12 min | parity to WS-23 | lower from 1-3 min |
| Sweetness | maybe low upfront (at ~1 min), higher from 12-15 min | higher from 12-18 min | higher from 12-18 min | parity to WS-23 | maybe low upfront (at ~3 min) |
| Bitterness | lower (when >6 min) | lower (when >12 min) | lower (when >20 min) | parity to WS-23 | parity to WS-23 |

The study revealed that the natural cooling blends demonstrated a good dose-response of cooling intensity versus the control. Among them, gum containing 0.1% natural Blend A with addition of 0.1% of L-menthol (Prototype IV) demonstrated sensory parity to the WS-23 control gum for the entire 20 minutes of chew.

The study also revealed that gums with the natural coolant blend showed a good dose-response for overall oral cool, nasal cool, and overall burn intensity for most time points tested. The addition of menthol (up to 0.2%) helped enhance overall oral cooling and nasal cooling intensity while maintaining overall flavor intensity and bitterness intensity. There was also no significant difference in overall flavor intensity for all prototypes tested versus the WS-23 control gum over the entire 20 minutes of chewing.

There was no significant difference of bitterness intensity for all prototypes tested versus the WS-23 control gum over the entire 20 minutes of chewing. However, Prototype III (containing 0.15% of Blend A) showed significantly lower levels of bitterness intensity at the 12 minute mark. Most of the prototype gums also demonstrated a low bitter intensity over time as compared to the WS-23 control gum.

Although the presently disclosed subject matter and its advantages have been described in detail, it should be understood that various changes, substitutions and alterations can be made herein without departing from the spirit and scope of the disclosed subject matter as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications publications product descriptions, and protocols are cited throughout this application the disclosures of which are incorporated herein by reference in their entireties for all purposes.

What is claimed is:

1. A cooling composition consisting essentially of:
   natural isopulegol;
   natural menthyl lactate;
   natural menthyl succinate; and
   optionally natural menthol, wherein
   natural isopulegol is present in an amount of from 40% to 50% w/w by weight of the cooling composition,
   natural menthyl lactate is present in an amount of from 27% to 30% w/w by weight of the cooling composition, and
   natural menthyl succinate is present from 18% to 30% w/w natural menthyl succinate by weight of the cooling composition, and
   wherein the cooling composition is a liquid stable at room temperature.

2. The cooling composition of claim 1, wherein the cooling composition consists essentially of 40% to 50% natural isopulegol, 27% to 30% natural menthyl lactate, 18% to 30% natural menthyl succinate, and from 5% to 10% w/w natural menthol.

3. The cooling composition of claim 1, wherein the cooling composition consists essentially of 50% natural isopulegol, 30% natural menthyl lactate, and 20% natural menthyl succinate.

4. The cooling composition of claim 1, wherein the cooling composition consists essentially of 45% natural isopulegol, 27% natural menthyl lactate, 18% natural menthyl succinate, and 10% natural menthol.

5. The cooling composition of claim 1, wherein the cooling composition consists essentially of 40% to 45% natural isopulegol, 27% to 30% natural menthyl lactate, 18% to 30% natural menthyl succinate, and 0 to 10% natural menthol.

6. The cooling composition of claim 1, wherein the cooling composition consists essentially of 45% to 50% natural isopulegol, 27% to 30% natural menthyl lactate, 18% to 20% natural menthyl succinate, and 0 to 10% natural menthol.

7. The cooling composition of claim 1, wherein the cooling composition is incorporated into a consumer product selected from the group consisting of compressed mint, chewing gum, chewy candy, lozenge, and hard candy.

8. The cooling composition of claim 1, wherein the cooling composition is present at a concentration of from about 0.0001 to about 3.0% weight/weight of the consumer product.

9. The cooling composition of claim 7, wherein the cooling composition consists essentially of 40% to 45% natural isopulegol, 27% to 30% natural menthyl lactate, 18% to 30% natural menthyl succinate, and 0 to 10% natural menthol.

10. The cooling composition of claim 7, wherein the cooling composition consists essentially of 45% to 50% natural isopulegol, 27% to 30% natural menthyl lactate, 18% to 20% natural menthyl succinate, and 0 to 10% natural menthol.

\* \* \* \* \*